US012794100B2

(12) United States Patent
Griffin et al.

(10) Patent No.: US 12,794,100 B2
(45) Date of Patent: Nov. 10, 2026

(54) WAVEGUIDE DEVICE FORMED BY THREE OR MORE STACKED DEVICE LAYERS FOR RECEIVING A CIRCUIT, TRANSMISSION LINE AND CORRECTIVE MISMATCH TRANSFORMER

(71) Applicant: Elve Inc., Davis, CA (US)

(72) Inventors: Blake Griffin, Seattle, WA (US); Richard Kowalczyk, Redwood City, CA (US)

(73) Assignee: Elve Inc., Davis, CA (US)

( * ) Notice: Subject to any disclaimer, the term of this patent is extended or adjusted under 35 U.S.C. 154(b) by 225 days.

(21) Appl. No.: 18/628,417

(22) Filed: Apr. 5, 2024

(65) Prior Publication Data

US 2024/0372238 A1 Nov. 7, 2024

Related U.S. Application Data

(60) Provisional application No. 63/464,602, filed on May 7, 2023.

(51) Int. Cl.
*H01P 5/02* (2006.01)

(52) U.S. Cl.
CPC .................................... *H01P 5/024* (2013.01)

(58) Field of Classification Search
CPC ... H01P 5/02; H01P 5/024; H01J 23/36; H01J 23/42
USPC ............................................................ 333/33
See application file for complete search history.

(56) References Cited

U.S. PATENT DOCUMENTS

| | | | | |
|---|---|---|---|---|
| 2,576,186 A * | 11/1951 | Malter et al. | H01P 1/08 315/39 |
| 2,985,792 A | 5/1961 | Bates et al. | |
| 3,048,800 A * | 8/1962 | Grabowski et al. | H01J 23/36 333/33 |
| 3,551,855 A * | 12/1970 | Seidel | H03H 7/38 333/33 |
| 4,370,596 A | 1/1983 | Winsor | |
| 7,482,894 B2 * | 1/2009 | Wu et al. | H01P 5/12 330/56 |
| 2004/0000963 A1 * | 1/2004 | Killen et al. | H01P 5/02 333/35 |
| 2012/0256708 A1 | 10/2012 | Reid, Jr. | |
| 2019/0267693 A1 | 8/2019 | Bennett et al. | |
| 2022/0157550 A1 | 5/2022 | Daugherty | |

* cited by examiner

*Primary Examiner* — Benny T Lee
(74) *Attorney, Agent, or Firm* — Sheppard Mullin Richter & Hampton LLP

(57) ABSTRACT

A circuit device fabricated in device layers, comprises a filter-type circuit fabricated in the device layers; a transmission line fabricated in the device layers and connected to the filter-type circuit; and a corrective mismatch disposed within the transmission line, fabricated in at least one of the device layers, and designed with a corrective impedance to improve matching performance therebetween. A waveguide device fabricated in device layers, comprises a first waveguide fabricated in the device layers and having a first dimension aligned with a first layer; a second waveguide fabricated in the device layers and having a second dimension aligned with a second layer; and a waveguide transformer fabricated in the device layers and having a transformer dimension aligned with a third layer.

16 Claims, 4 Drawing Sheets

WAVEGUIDE DEVICE FORMED BY THREE OR MORE STACKED DEVICE LAYERS FOR RECEIVING A CIRCUIT, TRANSMISSION LINE AND CORRECTIVE MISMATCH TRANSFORMER

PRIORITY CLAIM

This application claims benefit of and hereby incorporates by reference provisional patent application No. 63/464,602, entitled "Geometric Transformations for RF Performance in Layered Additive Manufacturing of Passive and Active RF Electronics," filed on May 7, 2023, by inventors Blake Griffin and Richard Kowalczyk.

TECHNICAL FIELD

This invention relates generally to passive and active radio frequency (RF) electronics, and more particularly provides geometric transformations in layered additive manufacturing of passive and active RF electronics for RF performance.

BACKGROUND

Layered additive multi-material-manufacturing (LAM3) processes have been developed to produce millimeter wave structures with high-quality radio-frequency (RF) performance that are also suitable for ultra-high vacuum operation of vacuum electronics. LAM3 processes provide improvements in manufacturing processes for RF electronic devices having multi-material layers bonded together to form one or more RF electronic devices simultaneously. LAM3 processes have been demonstrated in manufacturing of vacuum electronic devices, and apply to microwave frequencies, millimeter wave frequencies, as well as sub-terahertz and terahertz frequencies, active and passive devices, devices operating in vacuum or other atmospheric conditions, and devices manufactured with metallic or other multi-materials. See U.S. Pat. No. 11,894,208, which is hereby incorporated by reference.

SUMMARY OF EMBODIMENTS OF THE INVENTION

Embodiments of the present invention include the addition of geometric features in individual or multiple layers of passive or active RF electronic devices to achieve desired electromagnetic/radio-frequency (RF) performance.

An RF circuit often has impedance mismatching. When electromagnetic power is applied into an RF circuit, some portion of the electromagnetic power gets reflected due to the impedance mismatching, especially at the connection interface. To reduce the effects of impedance mismatching, transformers and matching networks may be used.

RF circuits with repeating elements can be used as filters and as interaction structures with electron beams. These repeating-element circuits may be referred to as "filter-type circuits". Two components are commonly used to allow RF signals to enter an interaction structure. First, a coupler couples the filter-type circuit to an intermediate transmission line matched to the filter-type circuit. Second, the intermediate transmission line is coupled to a standard transmission line (to which components mate). By "matching" impedances, especially between the interfaces, the structures may be designed to reflect minimal electromagnetic power and pass as much as possible.

Due to requirements outside of the RF domain, connections between filter-type circuits and transmission lines can be more challenging, often resulting in couplers that undesirably reflect large amounts of power. When a transmission line is connected to a filter-type circuit, the connection causes electromagnetic-signal reflections due to the mismatch as well as due to geometric features that introduce additional inductances and capacitances. Further, due to mechanical and/or other constraints, the transmission line may be positioned in certain locations with regard to the filter-type circuit, thereby increasing undesirable reflections at the interface.

In some embodiments, to correct for these "native" mismatches, a corrective mismatch can be added to the waveguide at one or more appropriate locations. If the corrective mismatch has the right amplitude and is 180-degrees out of phase with the native mismatch, the corrective mismatch can cancel out the native mismatch, thereby resulting in less total reflection and more electromagnetic power being transferred between the transmission line and the filter-type circuit.

A corrective mismatch can take various forms, depending on the type of transmission line and type of native mismatch. In a waveguide operating in a transverse electric (TE) mode, a feature on a narrow wall of the waveguide acts like an inductor, causing current to flow through additional paths. Similarly, in a waveguide operating in a TE mode, a feature on a broad wall acts like a capacitor, causing the electric fields to reduce or increase concentration in a location. In a transmission line, moving a structure a quarter wavelength away will cause a capacitive feature to look inductive and an inductive feature to look capacitive. Inductive and/or capacitive features control the phase of the corrective reflection. Properly selecting the phase of one or more corrective reflections can be used to cancel one or more native reflections. The magnitude of the corrective reflections can be calculated from Slater's perturbation method, or obtained from solutions in Marcuvitz's Waveguide Handbook, or solved using other electromagnetic field analysis theories or Finite Element Analysis.

In some embodiments, the corrective mismatch can be a bump positioned on a broad wall and/or narrow wall. Additionally or alternatively to bumps in the broad wall and/or narrow wall, a number of other types of features can be used in waveguides, such as irises, posts and stubs (shorted) lines. To address one or more native mismatches, a corrective feature can be used alone or in combination with other corrective features.

To introduce a corrective mismatch to cancel a native mismatch, the corrective mismatch is placed at a specific location such that the reflection from the corrective mismatch exactly cancels the native mismatch at the desired frequency (referred to as the "design frequency"). At any position an integral number of wavelengths towards or away from the native mismatch at the desired frequency, the cancelation will still apply. However, at any frequency not exactly at the designed frequency, the wavelength will be different (due to the standard wavelength frequency relations for electromagnetic waves). With a different wavelength (due to a different frequency), the corrective mismatch at the designed location will not perfectly cancel with the native reflection. The amount of error introduced will be dependent on the dispersive properties of the particular transmission line (calculable to one skilled in the art), but usually related to the difference from the design frequency at the frequency being considered. The behavior determines the "bandwidth" of the correction—i.e., the range over which the correction works to within some acceptable criteria. In addition, the error is proportional to the number of wavelengths between the native and the corrective mismatches, since at a specific frequency, each wavelength will incur a fixed error. Thus, the higher the total number of wavelengths between mismatches, the more rapidly the corrective mismatch will lose effectiveness as the frequency is adjusted from the design value. Thus the further in physical distance the corrective mismatch is from the native mismatch, the lower the bandwidth of the correction will be. To produce the most broadband corrective matching (which is often desired, for example to make a wideband amplifier capable of amplifying wide bandwidths to transmit high data rate information), the corrective mismatch may be better located as close as possible to the circuit-waveguide interface.

In some embodiments, a corrective mismatch may include an inductive bump added at a location as close as possible to the circuit interface. The location and magnitude of the inductive bump can be calculated by looking at the impedance into the circuit through the waveguide, for example, using a Smith Chart as an analytic tool. For a circuit fabricated in layers, the inductive bump can be included in one or more of the layers.

In accordance with some embodiments, the present invention provides a circuit device fabricated in device layers, the circuit device comprising a filter-type circuit fabricated in the device layers; a transmission line fabricated in the device layers and connected to the filter-type circuit; and a corrective mismatch disposed within the transmission line, fabricated in at least one of the device layers, and designed with a corrective impedance to improve matching performance between the filter-type circuit and the transmission line.

The corrective mismatch may be designed to counter a native mismatch. The transmission line may be a waveguide. The filter-type circuit may be a folded-waveguide circuit or serpentine-waveguide circuit with main propagation axes defined as a z-direction and the folded direction in a y-direction. The transmission line may propagate in x and the z directions, and the corrective mismatch may include an inductive or capacitive bump. The filter-type circuit may be for a traveling wave tube. The corrective mismatch may be positioned close to an interface between the filter-type circuit and the transmission line.

In accordance with some embodiments, the present invention provides a waveguide device fabricated in device layers, the waveguide device comprising a first waveguide fabricated in the device layers and having a first dimension aligned with a first layer of the device layers; a second waveguide fabricated in the device layers and having a second dimension aligned with a second layer of the device layers; and a waveguide transformer fabricated in the device layers, the waveguide transformer having a transformer dimension aligned with a third layer of the device layers.

The first dimension, the second dimension and the transformer dimension may be different dimensions. Each of the first dimension, the second dimension and the third dimension may be a height, a width or a length. Any of the first waveguide, the second waveguide and/or the waveguide transformer may be fabricated by removing material in one or more layers of the device layers. The waveguide transformer may be used in a traveling wave tube. The waveguide transformer may be a quarter-wave transformer. The waveguide transformer may come as close as possible to a quarter-wave transformer while ensuring that a transformer dimension matches a device layer thickness. A first dimension of the first waveguide may match a second dimension of the second waveguide. The waveguide transformer may be designed to minimize reflection over a range of frequencies.

DETAILED DESCRIPTION OF EMBODIMENTS OF THE INVENTION

Figure 1A:
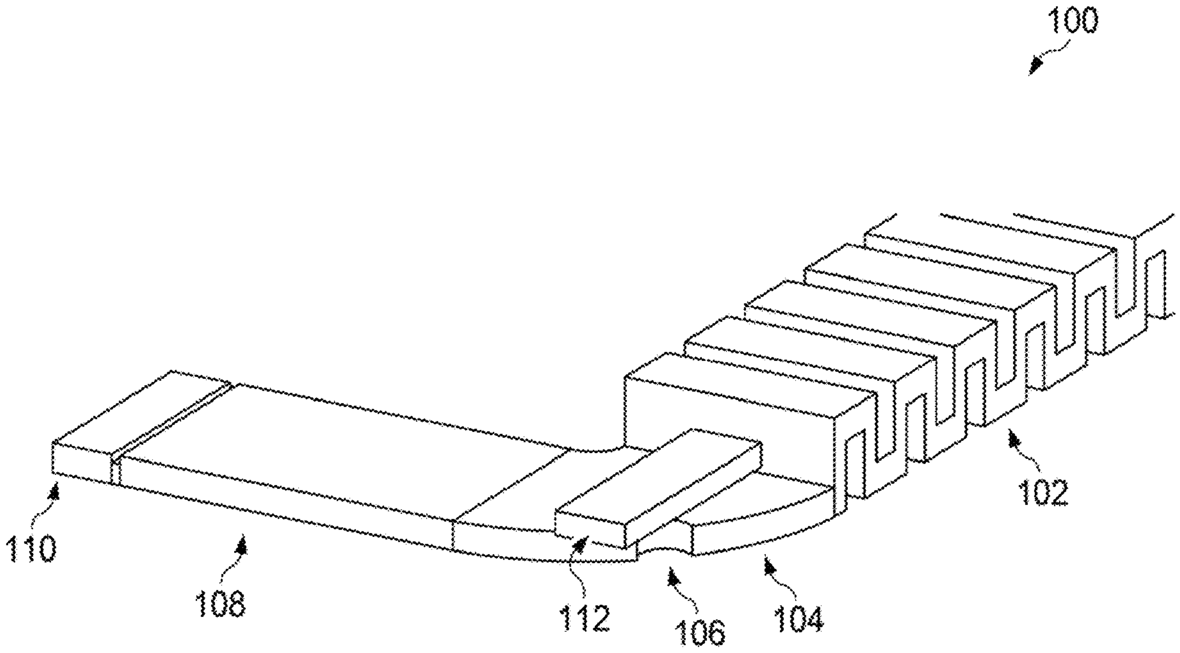
FIG. 1A shows perspective view of a slow-wave circuit device having waveguide matching in accordance with some embodiments.

The following description is provided to enable a person skilled in the art to make and use various embodiments of the invention. Modifications are possible. The generic principles defined herein may be applied to the disclosed and other embodiments without departing from the spirit and scope of the invention. Thus, the claims are not intended to be limited to the disclosed embodiments, but are to be accorded the widest scope consistent with the principles, features and teachings herein.

Embodiments of the present invention include the addition of geometric features in individual or multiple layers of passive or active RF electronic devices to achieve desired electromagnetic/radio-frequency (RF) performance.

An RF circuit often has impedance mismatching. When electromagnetic power is applied into an RF circuit, some portion of the electromagnetic power gets reflected due to the impedance mismatching, especially at the connection interface. To reduce the effects of impedance mismatching, transformers and matching networks may be used.

RF circuits with repeating elements can be used as filters and as interaction structures with electron beams. These repeating-element circuits may be referred to as filter-type circuits. Two components are commonly used to allow RF signals to enter an interaction structure. First, a coupler couples the filter-type circuit to an intermediate transmission line matched to the filter-type circuit. Second, the intermediate transmission line is coupled to a standard transmission line (to which components mate). By "matching" impedances, especially between the interfaces, the structures may be designed to reflect minimal electromagnetic power and pass as much as possible.

Due to requirements outside of the RF domain, connections between filter-type circuits and transmission lines can be more challenging, often resulting in couplers that undesirably reflect large amounts of power. When a transmission line is connected to a filter-type circuit, the connection causes electromagnetic-signal reflections due to the mismatch as well as due to geometric features that introduce additional inductances and capacitances. Further, due to mechanical and/or other constraints, the transmission line may be positioned in certain locations with regard to the filter-type circuit, thereby increasing undesirable reflections at the interface.

In some embodiments, to correct for these "native" mismatches, a corrective mismatch can be added to the waveguide at one or more appropriate locations. If the corrective mismatch has the right amplitude and is 180-degrees out of phase with the native mismatch, the corrective mismatch can cancel out the native mismatch, thereby resulting in less total reflection and more electromagnetic power being transferred between the transmission line and the filter-type circuit.

A corrective mismatch can take various forms, depending on the type of transmission line and type of native mismatch. In a waveguide operating in a transverse electric (TE) mode, a feature on a narrow wall of the waveguide acts like an inductor, causing current to flow through additional paths. Similarly, in a waveguide operating in a TE mode, a feature on a broad wall acts like a capacitor, causing the electric fields to reduce or increase concentration in a location. In a transmission line, moving a structure a quarter wavelength away will cause a capacitive feature to look inductive and an inductive feature to look capacitive. Inductive and/or capacitive features control the phase of the corrective reflection. Properly selecting the phase of one or more corrective reflections can be used to cancel one or more native reflections. The magnitude of the corrective reflections can be calculated from Slater's perturbation method, or obtained from solutions in Marcuvitz's Waveguide Handbook, or solved using other electromagnetic field analysis theories or Finite Element Analysis.

In some embodiments, the corrective mismatch can be a bump positioned on a broad wall and/or narrow wall. Additionally or alternatively to bumps in the broad wall and/or narrow wall, a number of other types of features can be used in waveguides, such as irises, posts and stubs (shorted) lines. To address one or more native mismatches, a corrective feature can be used alone or in combination with other corrective features.

To introduce a corrective mismatch to cancel a native mismatch, the corrective mismatch is placed at a specific location such that the reflection from the corrective mismatch cancels the native mismatch at the desired frequency (referred to as the "design frequency"). At any position an integral number of wavelengths towards or away from the native mismatch at the design frequency, the cancelation will still apply. However, at any frequency not exactly at the design frequency, the wavelength will be different (due to the standard wavelength frequency relations for electromagnetic waves). With a different wavelength (due to a different frequency), the corrective mismatch at the designed location will not perfectly cancel with the native reflection. The amount of error introduced will be dependent on the dispersive properties of the particular transmission line (calculable to one skilled in the art), but usually related to the difference from the design frequency at the frequency being considered. The behavior determines the "bandwidth" of the correction—i.e., the range over which the correction works to within some acceptable criteria. In addition, the error is proportional to the number of wavelengths between the native and the corrective mismatches, since at a specific frequency, each wavelength will incur a fixed error. Thus, the higher the total number of wavelengths between mismatches, the more rapidly the corrective mismatch will lose effectiveness as the frequency is adjusted from the design value. Thus the further in physical distance the corrective mismatch is from the native mismatch, the lower the bandwidth of the correction will be. To produce the most broadband corrective matching (which is often desired, for example to make a wideband amplifier capable of amplifying wide bandwidths to transmit high data rate information), the corrective mismatch may be better located as close as possible to the circuit-waveguide interface.

In some embodiments, a corrective mismatch may include an inductive bump added at a location as close as possible to the circuit interface. The location and magnitude of the inductive bump can be calculated by looking at the impedance into the circuit through the waveguide, for example, using a Smith Chart as an analytic tool. For a circuit fabricated in layers, the inductive bump can be included in one or more of the layers.

Figure 1B:
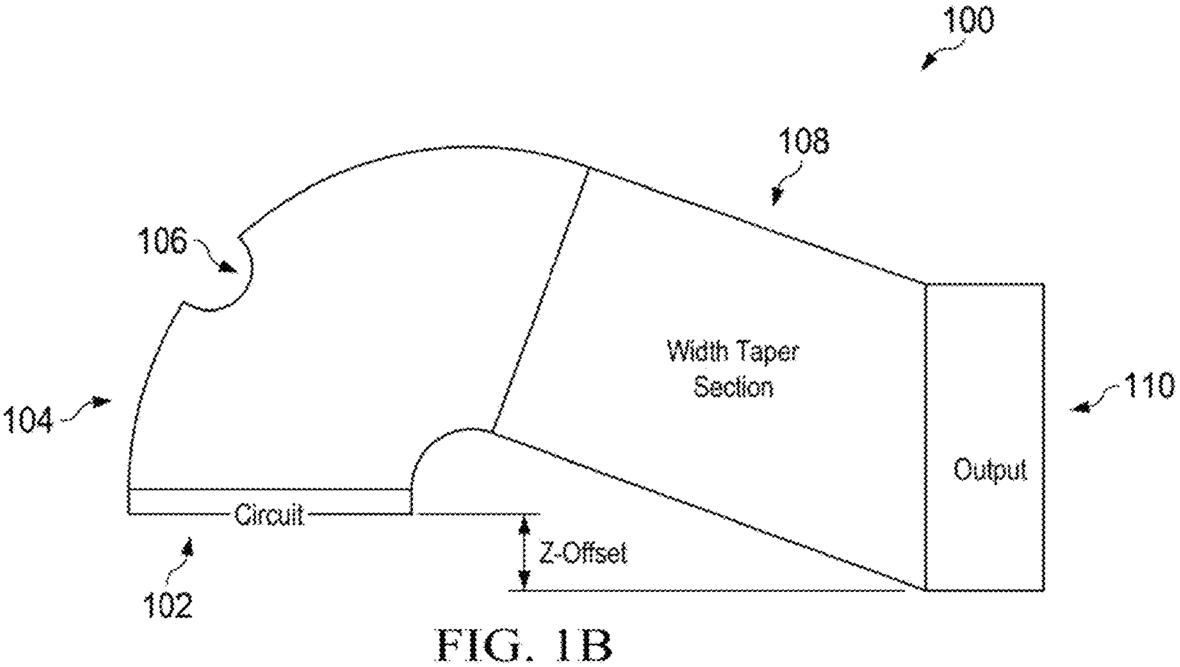
FIG. 1B shows a cross-sectional view of the slow-wave circuit device having waveguide matching in accordance with some embodiments.

FIG. 1A shows perspective view of a slow-wave circuit device 100 having waveguide matching in accordance with some embodiments. FIG. 1B shows a cross-sectional view of the slow-wave circuit device 100 having waveguide matching in accordance with some embodiments. As shown in both FIGS. 1A and 1B, the slow-wave circuit device 100 includes a repeating-pattern circuit 102 (e.g., a folded-waveguide circuit or serpentine-waveguide circuit) connected to a coupler 104 connected to an intermediate transmission line 108 connected to an output transmission line 110 designated as Output.

The coupler 104 includes a corrective mismatch 106 that includes an inductive bump matching feature. The inductive bump takes the form of a perturbation to the natural shape of the waveguide narrow wall. The perturbation can protrude inward (making the waveguide narrower) or outward (making the waveguide wider). Radio frequency currents flowing through the walls of the waveguide are most affected by the geometric change, so the mismatch is referred to as inductive.

It may be desired to route a waveguide port to a specific location at an arbitrary offset from the end of the circuit 102. As an example, a z-offset is shown in FIG. 1B of the circuit device 100 in which the waveguide completes a turn of greater than ninety degrees then follows an angled path (relative to circuit axis) for a distance before turning again to travel 90 degrees from the circuit axis. This approach allows the end position of the waveguide (the port) to be positioned arbitrarily from the start or end of the circuit 102. The bends done to achieve this routing introduce native mismatches which require corrective mismatches to improve the return loss. (In FIG. 1B, the beam axis in the circuit is the z axis, the y axis is to the right, and the x axis is in and out of the page.)

The rectangular section on the top of circuit device 100 is the beam tunnel 112 as shown in FIG. 1A—the region of removed material through which an electron beam travels when interacting with the circuit 102. The beam tunnel 112 can be thought of as a long rectangular solid cutout running through the entire circuit 102. The ends appear truncated in this model—in a traveling wave tube (TWT), the ends would be open to the electron gun at one end to launch the electron beam, and the collector at the other end to collect the electron beam.

To transition across transmission lines, a matching transformer can be used. A matching transformer can take the form of one or more intermediate sections of transmission line with dimensions (e.g., height, width and/or length) and impedances chosen to minimize total reflection. Often, the small mismatch theory is applied to make these calculations.

Different versions of matching transformers can be used. For example, a quarter wave transformer, in which a single section of transmission line with impedance equal to the square root of the desired input and output impedance multiplied together, can be used. For improved matching and/or bandwidth, transformers with larger numbers of steps can be used.

For circuits fabricated in discrete layers, such as those fabricated using LAM3 processes, it may be advantageous for manufacturing simplicity to have heights of the transformer stages to match with the material thickness (layer) boundaries. A pseudo-quarter-wave waveguide height transformer can be built by starting with an ideal quarter wave transformer, in which the waveguide width remains fixed, and the waveguide height in the middle quarter-wave long section is the geometric mean of the input and output heights. The waveguide height in the middle section can be set to match a layer thickness, so all features can be made through features in layers. A non-ideal impedance in a middle section can be tolerated, resulting in a close to optimum transformer, and/or the width of a feature can be adjusted so that the transformer has the correct impedance for an ideal matching condition.

This same approach can be employed in any transformer or plurality of transformer stages. The height of each transformer stage can be designed to match layer thicknesses, and the width of each transformer stage can be designed to match the first (e.g., starting) or second (e.g., ending) waveguide, or can be calculated to optimize the RF performance. The length of each section can be optimized to meet RF requirements.

Although the circuit is shown as fabricated in a height-wise direction, the circuit can be fabricated in layers in other directions, e.g., width-wise or length-wise. If the circuit is fabricated based on layers in other directions, then a similar approach can be taken by designing one of the dimensions to the layer thickness. That is, the waveguide width can be designed as a multiple of layer thicknesses, or the waveguide length can be designed as a multiple of layer thicknesses.

Figure 2A:
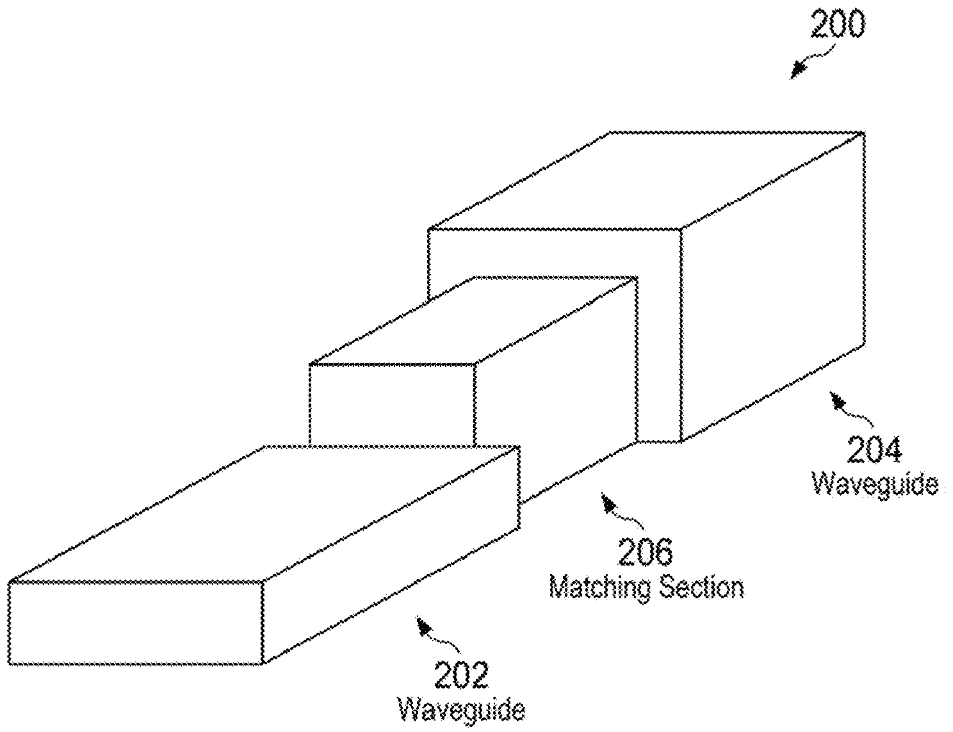
FIG. 2A shows an example transmission device having first and second transmission lines (shown as waveguides) coupled via a matching section in accordance with some embodiments.
Figure 2B:
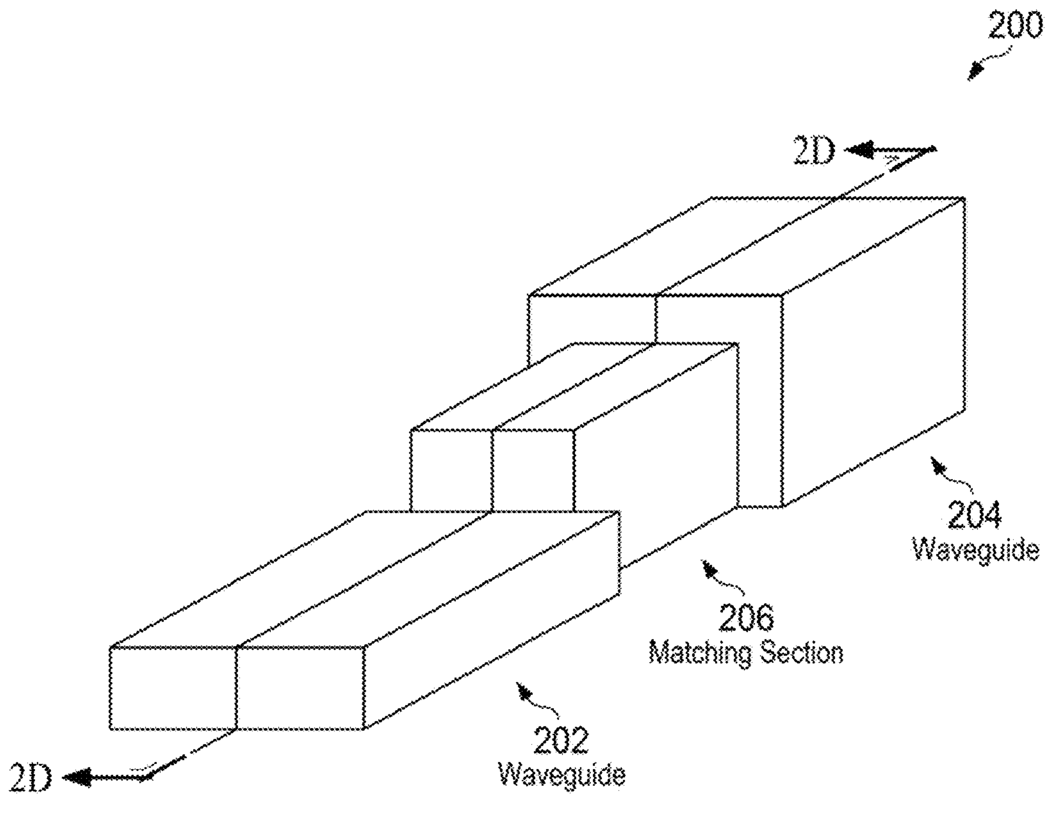
FIG. 2B shows the position of a cross-sectional side view of the example transmission device shown in FIG. 2D in accordance with some embodiments.
Figure 2C:
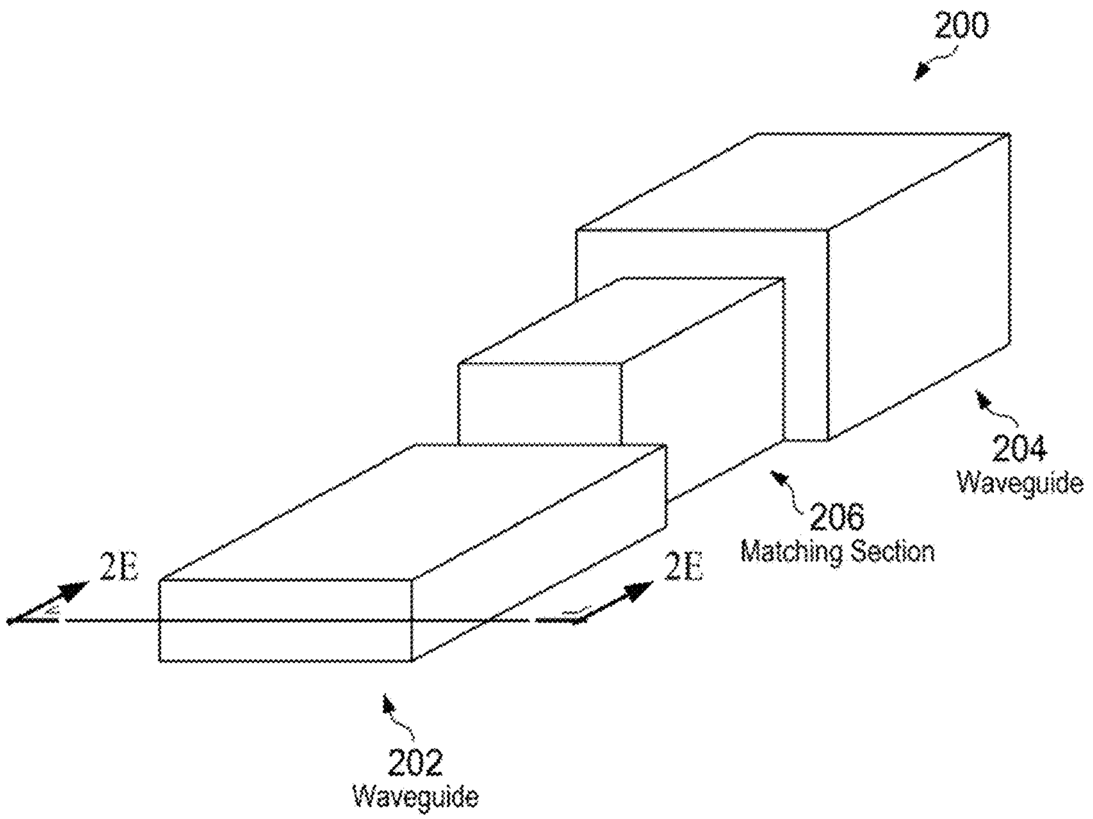
FIG. 2C shows the position of the cross-sectional planar view of the example transmission device shown in FIG. 2E in accordance with some embodiments.

FIGS. 2A, 2B and 2C show an example transmission device 200 having first and second transmission lines (shown as waveguides) 202 and 204 coupled via a matching section (transformer) 206 in accordance with some embodiments. In some embodiments, the matching section 206 may include a quarter-wavelength transformer 206 suitable for use with layered circuit fabrication. The first waveguide 202 (possibly the starting waveguide) with a first height is shown on the left, and the second waveguide 204 (possibly the final waveguide) with a second height is shown on the right. The matching section 206 may be a quarter-wavelength long as the designed center frequency, and the waveguide width and height may be designed so that the impedance is the geometric mean of the first impedance of the first waveguide 202 and the second impedance of the second waveguide 204. In some embodiments, the waveguide height of the matching section 206 may be fabricated to match an existing layer thickness, and the waveguide width of the intermediate section 206 may be fabricated to achieve the correct impedance. Alternatively, the waveguide width can be left the same as the first waveguide 202 and second waveguide 204, and the height can be chosen to come as close as possible to the desired impedance while still matching a layer thickness. In some embodiments, the height of each layer of the matching section 206 is chosen to match a layer thickness, and the length of each section is optimized to minimize the reflected power over the desired band. Dimensions can be chosen according to well-known design techniques, or through an optimization in an electromagnetic field solver.

Figure 2D:
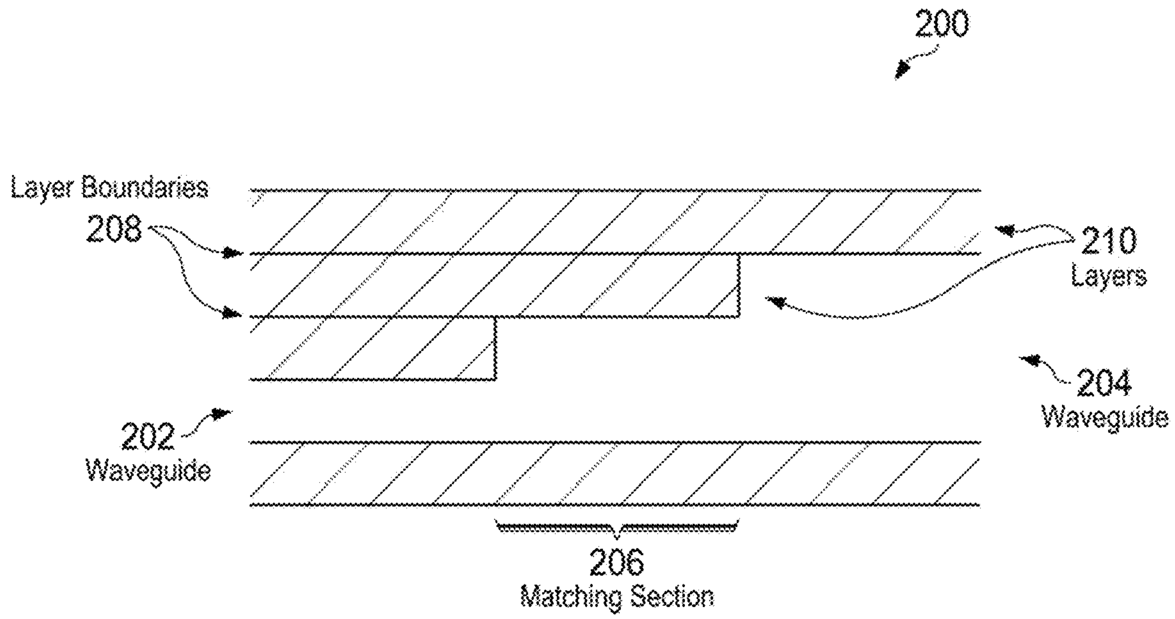
FIG. 2D shows a cross-sectional side view of the example transmission device in accordance with some embodiments.

FIG. 2B shows the position of the cross-sectional side view along line 2D-2D of the example transmission device 200 shown in FIG. 2D. FIG. 2C shows the position of the cross-sectional planar view along line 2E-2E of the example transmission device 200 shown in FIG. 2E.

As shown in FIG. 2D, the first waveguide 202 is coupled to the second waveguide 204 via the matching section 206. The first waveguide 202 includes a height of a single layer 210, disposed in the second layer 210 and having three layers 210 above and one layer 210 below. The second waveguide 204 includes a height of three layers 210 in the second, third and fourth layers 210 and having one layer 210 above and one layer 210 below. The matching section 206 includes a height of two layers, disposed in the second and third layers 210, and having two layers 210 above and one layer 210 below. As shown, the height of each waveguide segment (e.g., first waveguide 202, second waveguide 204 and matching section 206) may be fabricated according to an integral multiple of the same device layers 210. In some embodiments, each segment may have different layer thicknesses. In some embodiments, the matching section 206 may include a layer thickness different than the first waveguide 202 and the second waveguide 204, while the first waveguide 202 and the second waveguide 204 may have the same layer thicknesses. In some embodiments, the matching section 206 may have a height that does not terminate coplanar with the layer boundaries 208 of one or both of the first waveguide 202 and second waveguide 204. Although the matching section 206 is shown to have a length equal to the length of the first waveguide 202 and the second waveguide 204, in some embodiments, the matching section 206 may have a length longer or shorter than one or both of the first waveguide 202 and the second waveguide 204 and may be designed based on RF performance requirements.

Figure 2E:
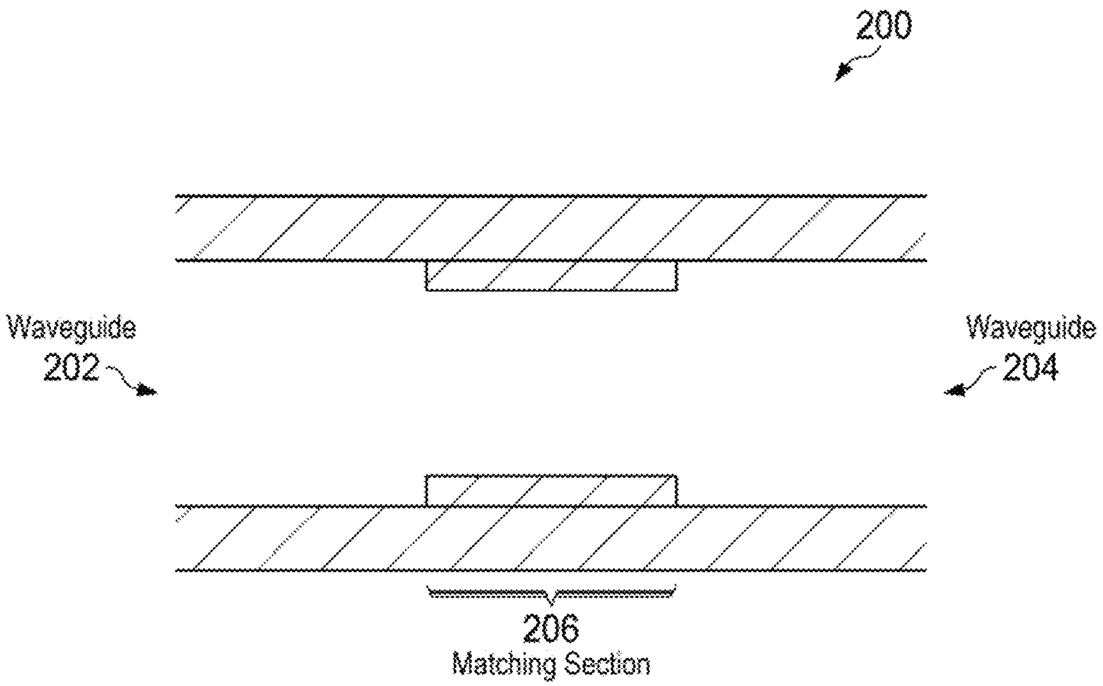
FIG. 2E shows a cross-sectional planar view of the example transmission device in accordance with some embodiments.

As shown in FIG. 2E, the first waveguide 202 is coupled to the second waveguide 204 via the matching section 206. As further shown, the first waveguide 202 has a first width, the second waveguide 204 has the same width as the first waveguide (although it need not be), and the matching section 206 has a width narrower than the first and second waveguides 202 and 204. Although the matching section 206 is shown to have a different width that the first waveguide 202 and the second waveguide 204, in some embodiments, the matching section 206 may have a width equal to one or both of the first waveguide 202 and the second waveguide 204. Although the matching section 206 is shown to have a width narrower than the first waveguide 202 and the second waveguide 204, in some embodiments, the matching section 206 may have a width wider than one or both of the first waveguide 202 and the second waveguide 204.

Referring back to FIGS. 1A and 1B, it was shown that the waveguide width can be tapered from one value to another value (i.e. a width taper section as shown in FIG. 1B). Provided that both the starting and ending widths are wide enough to avoid cutoff of the frequency of interest, this taper can be used to transition from one impedance to another impedance. It can also be used to change from a waveguide width chosen to meet another need (such as circuit properties for interaction with an electron beam) to standard waveguide sizes that can mate with commercially available waveguides. If the taper happens over at least a wavelength, then the mismatch caused by the taper will be small. The taper may be linear between the two widths, or take another form, such as an exponential taper. Certain forms have beneficial RF properties that would be understood by one skilled in the art.

Embodiments of the solution can be used in active and passive electronic devices as well as in vacuum and non-vacuum electronic devices. Embodiments of the solution can be used in travelling wave tubes (TWTs).

The foregoing description of the preferred embodiments of the present invention is by way of example only, and other variations and modifications of the above-described embodiments and methods are possible in light of the foregoing teaching. The embodiments described herein are not intended to be exhaustive or limiting. The present invention is limited only by the following claims.

The invention claimed is:

1. A waveguide circuit device, comprising:

three or more device layers stacked and bonded together;

a first circuit disposed in at least a first one of the three or more device layers, and having at least two first dimensions aligned with at least two first layers of the three or more device layers;

a transmission line disposed in at least a second one of the three or more device layers and connected to the first circuit at a boundary, the boundary acting as a native mismatch inducing negative effects in a traveling wave traveling therein, the transmission line having at least two second dimensions aligned with at least two second layers of the three or more device layers; and a corrective mismatch disposed in at least a third one of the three or more device layers and designed with a corrective impedance to induce corrective effects to reduce the negative effects induced by the boundary between the first circuit and the transmission line.

2. The waveguide circuit device of claim 1, wherein the corrective mismatch is disposed in the first circuit.

3. The waveguide circuit device of claim 1, wherein the corrective mismatch is disposed in the transmission line.

4. The waveguide circuit device of claim 1, wherein the corrective mismatch is a post.

5. The waveguide circuit device of claim 1, wherein the corrective mismatch includes an inductive or capacitive bump.

6. The waveguide circuit device of claim 1, wherein the first circuit includes a filter-type circuit.

7. The waveguide circuit device of claim 1, wherein the corrective mismatch is positioned close to the boundary between the first circuit and the transmission line.

8. The waveguide circuit device of claim 1, wherein the corrective mismatch is an iris.

9. The waveguide circuit device of claim 1, wherein the at least the first one of the three or more device layers is the same as the at least the second one of the three or more layers.

10. The waveguide circuit device of claim 1, wherein the at least the first one of the three or more device layers is the same as the at least the third one of the three or more layers.

11. The waveguide circuit device of claim 1, wherein the at least the second one of the three or more device layers is the same as the at least the third one of the three or more layers.

12. The waveguide circuit device of claim 1, wherein the corrective mismatch is a stub.

13. A waveguide device, comprising:

three or more device layers stacked and bonded together;

a first waveguide disposed in at least a first one of the three or more device layers and having at least two first dimensions aligned with at least two first layers of the three or more device layers;

a second waveguide disposed in at least a second one of the three or more device layers and having at least two second dimensions aligned with at least two second layers of the three or more device layers; and a waveguide transformer disposed in at least a third one of the three or more device layers and positioned between the first waveguide and the second waveguide, the waveguide transformer having at least two transformer dimensions aligned with at least two third layers of the three or more device layers, the transformer dimensions configured to reduce negative effects induced were the first waveguide connected directly to the second waveguide.

14. The waveguide device of claim 13, wherein each of the at least two first dimensions, the at least two second dimensions and the at least two transformer dimensions involve a length.

15. The waveguide device of claim 13, wherein each of the at least two first dimensions, the at least two second dimensions and the at least two transformer dimensions involve height.

16. The waveguide device of claim 13, wherein each of the at least two first dimensions, the at least two second dimensions and the at least two transformer dimensions involve a width.

* * * * *